United States Patent
Rösseler et al.

(10) Patent No.: US 11,255,399 B2
(45) Date of Patent: Feb. 22, 2022

(54) DAMPING VALVE FOR A VIBRATION DAMPER

(71) Applicant: ZF Friedrichshafen AG, Friedrichshafen (DE)

(72) Inventors: Jörg Rösseler, Ruppichteroth (DE); Aleksandar Knezevic, Eitorf (ME); Steffen Heyn, Niederwerrn (DE); Guido Holtmann, Windeck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 337 days.

(21) Appl. No.: 16/291,359

(22) Filed: Mar. 4, 2019

(65) Prior Publication Data

US 2019/0285130 A1   Sep. 19, 2019

(30) Foreign Application Priority Data

Mar. 14, 2018 (DE) ..................... 10 2018 203 850.3

(51) Int. Cl.
    *F16F 9/34*    (2006.01)
    *F16K 47/00*   (2006.01)
    *F16F 9/348*   (2006.01)
    *F16F 9/18*    (2006.01)

(52) U.S. Cl.
    CPC .......... *F16F 9/3485* (2013.01); *F16F 9/3481* (2013.01); *F16K 47/00* (2013.01); *F16F 9/185* (2013.01); *F16F 9/341* (2013.01); *F16F 2222/12* (2013.01); *F16F 2232/08* (2013.01)

(58) Field of Classification Search
    CPC ........ F16F 9/3485; F16F 9/3481; F16F 9/341; F16F 9/3488; F16F 9/185; F16F 2232/08; F16F 2222/12; F16K 47/00
    See application file for complete search history.

(56) References Cited

U.S. PATENT DOCUMENTS

| | | | | |
|---|---|---|---|---|
| 4,337,849 A | * | 7/1982 | Siorek | F16F 9/52 184/6.22 |
| 4,819,773 A | * | 4/1989 | Ito | F16F 9/3484 188/282.5 |
| 4,993,524 A | * | 2/1991 | Grundei | F16F 9/348 188/282.6 |
| 5,042,624 A | * | 8/1991 | Furuya | F16F 9/3484 188/280 |
| 5,219,414 A | * | 6/1993 | Yamaoka | F16F 9/48 188/284 |
| 5,226,512 A | * | 7/1993 | Kanari | F16F 9/512 188/282.2 |
| 5,259,294 A | * | 11/1993 | May | F16F 9/3214 188/322.15 |

(Continued)

FOREIGN PATENT DOCUMENTS

DE     21 09 398     9/1972

*Primary Examiner* — Robert A. Siconolfi
*Assistant Examiner* — James K Hsiao
(74) *Attorney, Agent, or Firm* — Cozen O'Connor

(57) ABSTRACT

A damping valve includes a damping valve body with an annular groove which has a base and which is limited by an inner valve seat surface and an outer valve seat surface for at least one valve disk. The base of the annular groove has a maximum distance from the valve seat surface along a circumferential area and has a minimum axial distance from the valve seat surface in another circumferential area.

7 Claims, 3 Drawing Sheets

(56) References Cited

U.S. PATENT DOCUMENTS

| | | | | |
|---|---|---|---|---|
| 5,277,283 A * | 1/1994 | Yamaoka | | F16F 9/512 |
| | | | | 188/266.4 |
| 5,332,069 A * | 7/1994 | Murakami | | F16F 9/3484 |
| | | | | 188/282.6 |
| 5,813,500 A * | 9/1998 | Deferme | | F16F 9/341 |
| | | | | 188/282.8 |
| 5,921,360 A * | 7/1999 | Moradmand | | F16F 9/512 |
| | | | | 188/322.22 |
| 6,464,053 B1 * | 10/2002 | Hoebrechts | | F16F 9/3405 |
| | | | | 188/282.5 |
| 6,899,207 B2 * | 5/2005 | Deferme | | F16F 9/348 |
| | | | | 188/282.5 |
| 7,143,992 B2 * | 12/2006 | Sassone | | F16K 31/404 |
| | | | | 251/127 |
| 9,121,524 B2 * | 9/2015 | Ashiba | | F16F 9/3485 |
| 9,182,005 B2 * | 11/2015 | Goldasz | | F16F 9/3484 |
| 9,188,117 B2 * | 11/2015 | Ito | | F04B 39/10 |
| 9,194,455 B2 * | 11/2015 | Ashiba | | F16F 9/348 |
| 9,605,726 B2 * | 3/2017 | Baldoni | | B60G 15/062 |
| 9,657,755 B2 * | 5/2017 | Wilmot | | F15B 15/204 |
| 9,739,294 B2 * | 8/2017 | Wilmot | | F15B 15/149 |
| 10,138,976 B2 * | 11/2018 | Miwa | | F16F 9/3481 |
| 10,941,828 B2 * | 3/2021 | Franklin | | F16F 9/46 |
| 2011/0031077 A1 * | 2/2011 | Slusarczyk | | F16F 9/512 |
| | | | | 188/322.15 |
| 2013/0105261 A1 * | 5/2013 | Murata | | F16F 9/3485 |
| | | | | 188/322.14 |
| 2015/0008083 A1 * | 1/2015 | Yamada | | F16F 9/348 |
| | | | | 188/322.15 |
| 2015/0014107 A1 * | 1/2015 | Svara | | F16F 9/443 |
| | | | | 188/317 |
| 2015/0034182 A1 * | 2/2015 | Ashiba | | F16F 9/062 |
| | | | | 137/514.7 |
| 2015/0198214 A1 * | 7/2015 | Mizuno | | F16F 9/512 |
| | | | | 188/280 |
| 2015/0330475 A1 * | 11/2015 | Slusarczyk | | F16F 9/49 |
| | | | | 188/288 |
| 2017/0321778 A1 | 11/2017 | Knezevic | | |
| 2018/0010665 A1 * | 1/2018 | Ashiba | | F16F 9/348 |
| 2018/0180134 A1 * | 6/2018 | Forster | | F16F 9/5126 |
| 2018/0216691 A1 * | 8/2018 | Nagai | | F16F 9/44 |
| 2018/0328445 A1 * | 11/2018 | Gilbert | | F16F 9/3485 |
| 2018/0335105 A1 * | 11/2018 | De Kock | | F16F 9/34 |
| 2018/0355945 A1 * | 12/2018 | De Kock | | F16F 9/3482 |
| 2019/0038437 A1 * | 2/2019 | Ozturk | | F16F 9/20 |
| 2019/0271373 A1 * | 9/2019 | Cox | | F16F 9/348 |
| 2021/0252935 A1 * | 8/2021 | Belter | | B60G 11/26 |

\* cited by examiner

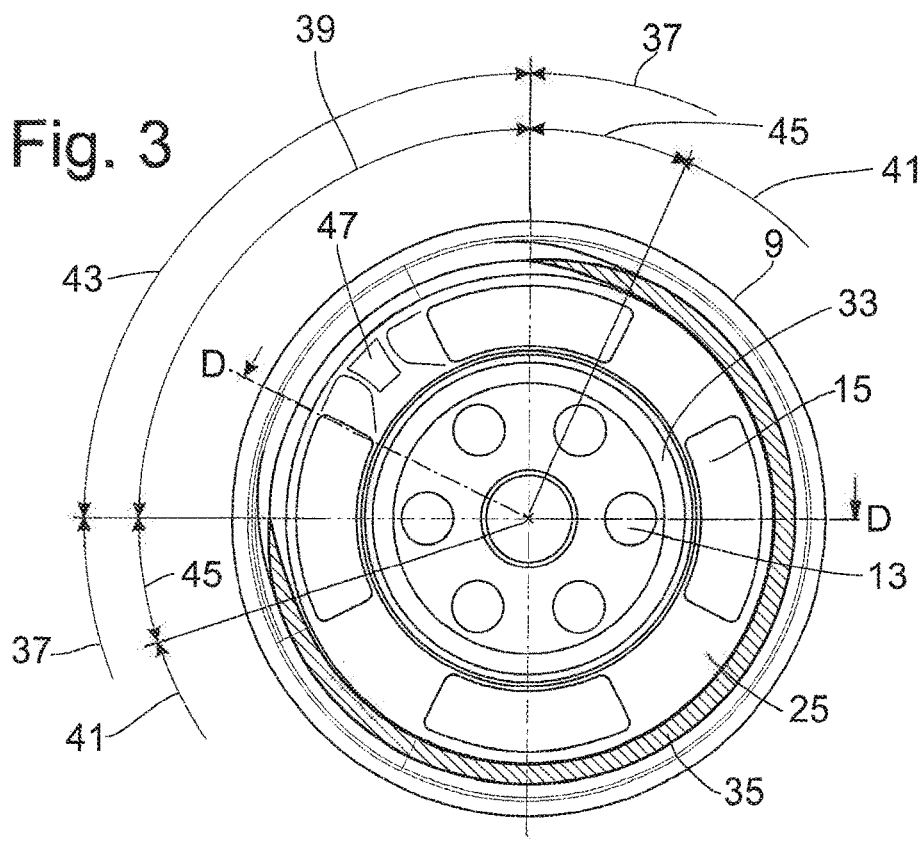
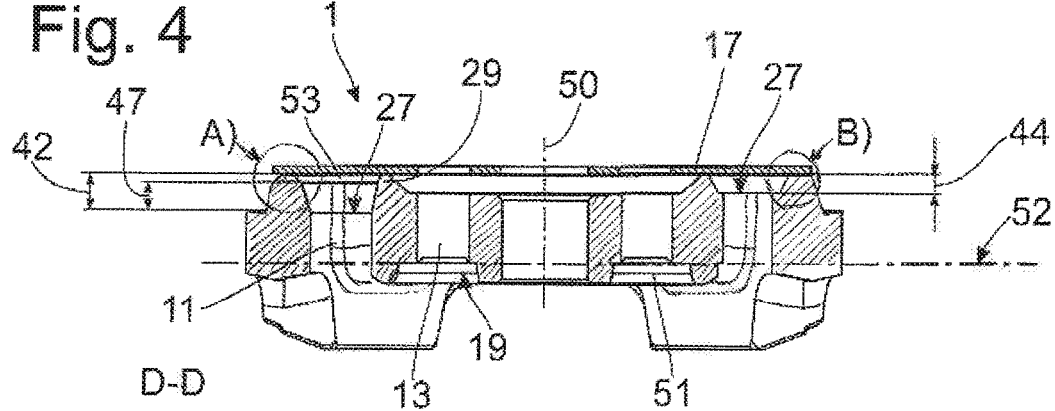
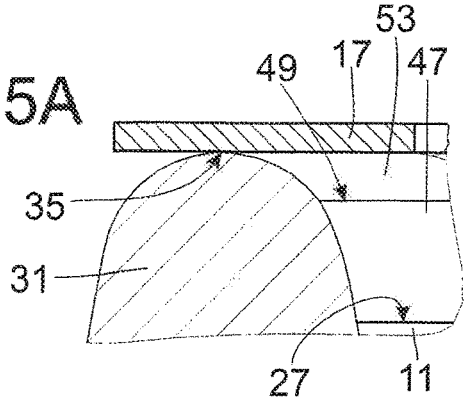

DAMPING VALVE FOR A VIBRATION DAMPER

BACKGROUND OF THE INVENTION

US 2017/321778 A1, the entire content of which is hereby incorporated by reference herein, describes a damping valve with an annular groove which is limited radially inward and radially outward by a valve seat surface. At least one valve disk which executes a lift-off movement depending on the pressure inside of the annular groove having a uniform depth lies on the valve seat surfaces. In order to prevent chattering noises, a single lift-off point is aimed at for the valve disk, if possible. In US 2017/321778 A1, the adhering effect of the valve seat surface is made use of and, therefore, a crescent profile is used along the entire circumference of a valve seat surface. The valve disk initially lifts off in the area of the smallest radial width of the valve seat surface.

Alternatively, the annular groove can be dimensioned radially with variable width or the valve disk can be arranged off-center to the annular groove as is disclosed, e.g., in DE 21 09 398 A1.

FIELD OF THE INVENTION

The invention is directed to a damping valve with a valve body having an annular groove which has a base and which is limited by an inner valve seat surface and an outer valve seat surface for at least one valve disk.

SUMMARY OF THE INVENTION

It is an object of the present invention to realize a damping valve in the simplest possible manner in which the at least one valve disk lifts from the valve seat surface beginning at a single point as far as possible.

The above-stated object is met in that the base of the annular groove has a maximum distance from the valve seat surface along a circumferential area and has a minimum axial distance from the valve seat surface in a circumferential area.

When flow impinges on the valve disk via the annular groove, an irregular pressure level occurs. The pressure level in the area where the distance of the base from the valve seat surface is greater is higher than in the area where the distance is shorter, i.e., the flatter annular groove. Crucial to this is the variable annular groove cross section which constitutes a throttle leading to the pressure differences in the annular groove. Through this selective use of pressure, the opening behavior of the valve disk can be favorably influenced as regards noise behavior. A further advantage consists in that uniformly round valve disks can still be used.

Damping valve bodies are often produced by sintering techniques. In order to favorably affect the production process, the annular groove has an inclined transitional area between the circumferential area having maximum distance and an adjoining circumferential area having a shorter distance. Abrupt changes in cross section are minimized with the transitional area.

In a further advantageous embodiment, at least a proportion of the material volume arising from the differences in distance in the annular groove is arranged separate from a functional surface of the damping valve body. A symmetry is sought for in the structural component part when produced by sintering techniques. The annular groove with different depths would interfere with this symmetry. Therefore, for balance, an accumulation of material located outside of the functional surface, e.g., the valve seat surfaces or clamping surfaces, is carried out.

Advantageously, the material volume is arranged in the annular groove. The annular groove serves primarily to provide a large pressure-impinged surface area at the valve disk. Filling up a portion of the annular groove with the material volume represents only a barely measurable functional impairment of the annular groove.

An axial offset is provided between an upper side of the material volume and the valve seat surface. As a result of this step, a supporting function of the material volume for the valve seat surface shall be avoided.

In addition, the material volume can be arranged in the circumferential area of the annular groove having the maximum distance. The reason for this step consists in that the material volume which is displaced to form the annular groove is placed at a shortest possible distance. The sintering process can be favorably influenced in this way.

In a further embodiment, the material volume is formed as a cone. The conical shape is intended to prevent abrupt changes in cross section which, for example, could provide for turbulences in the flow in the annular groove.

Trials have shown that it is particularly advantageous when the annular groove has at least two adjacent inlet orifices in the circumferential area having the maximum distance, and the material volume is arranged between the two inlet orifices. Particularly in combination with the conical shape of the material volume, the flow cross sections in the annular groove are advantageously affected.

Optionally, the damping valve body can have a plane at right angles to the longitudinal axis of the damping valve body on the side remote of the annular groove along the entire circumference. The advantage consists in that conventional valve disks may continue to be used.

In combination with the different depths of the annular groove, it has turned out to be very advantageous when at least one of the valve seat surfaces has a crescent shape, and a circumferential area of the valve seat surface with the greatest radial width is arranged in the area in which the distance of the base of the annular groove from the valve seat surface is minimal. By combining the actions of the two individual effects, i.e., variable pressure distribution in the annular groove and variable adhering effect of the valve seat surface to the valve disk, an even greater influence can be exerted on the lift-off behavior of the valve disk, and the valve disk itself can be mounted in circumferential direction without a particular orientation.

BRIEF DESCRIPTION OF THE DRAWINGS

The invention will be described in more detail referring to the following description of the figures, in which:

FIG. 3 is a top view of the damping valve body;

FIG. 4 is a sectional view of the damping valve body; and

FIGS. 5A, 5B are enlarged sectional views of the valve seat surfaces shown in FIG. 4.

DETAILED DESCRIPTION OF THE PRESENTLY PREFERRED EMBODIMENTS

Figure 1:
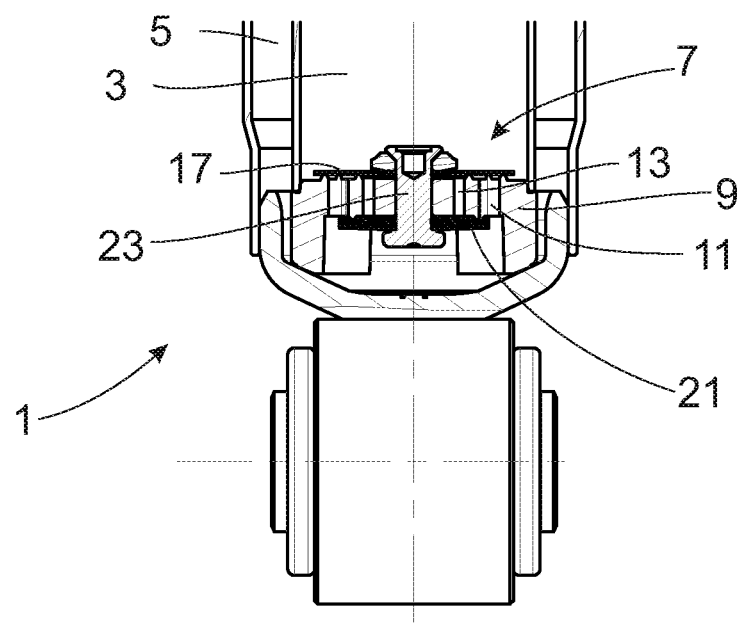
FIG. 1 is a sectional view of a vibration damper.

FIG. 1 shows by way of example a section from a vibration damper 1 constructed as a twin-tube damper having a damping valve 7 constructed as a bottom valve between a working chamber 3 filled with damping medium and a compensation space 5. In principle, the damping valve 7 can also be applied in a piston rod or as a pilot valve for an adjustable damping valve. The possible applications are not shown in the drawings, nor are they limited to the cases mentioned herein.

The damping valve 7 comprises a plurality of separate passages 11; 13 for different flow directions, these passages 11; 13 penetrating a damping valve body 9. The passages 11; 13, each for a flow direction, are formed on a common pitch circle. The passages 11 connect the compensation space 5 to the working chamber 3, and an inlet orifice 15 (FIG. 2) for the damping medium is covered by at least one valve disk 17.

In the opposite direction, the damping medium flows via passages 13 into the compensation space 5, and the inlet orifice 15 is covered by at least one valve disk 21 (FIG. 1) in this case also. The entire composite comprising valve disks 17 for the flow direction into the working chamber, the damping valve body 9 and the valve disks 21 for the flow direction into the compensation space are held together by a fastener 23, often a rivet, and form a manageable constructional unit.

Figure 2:
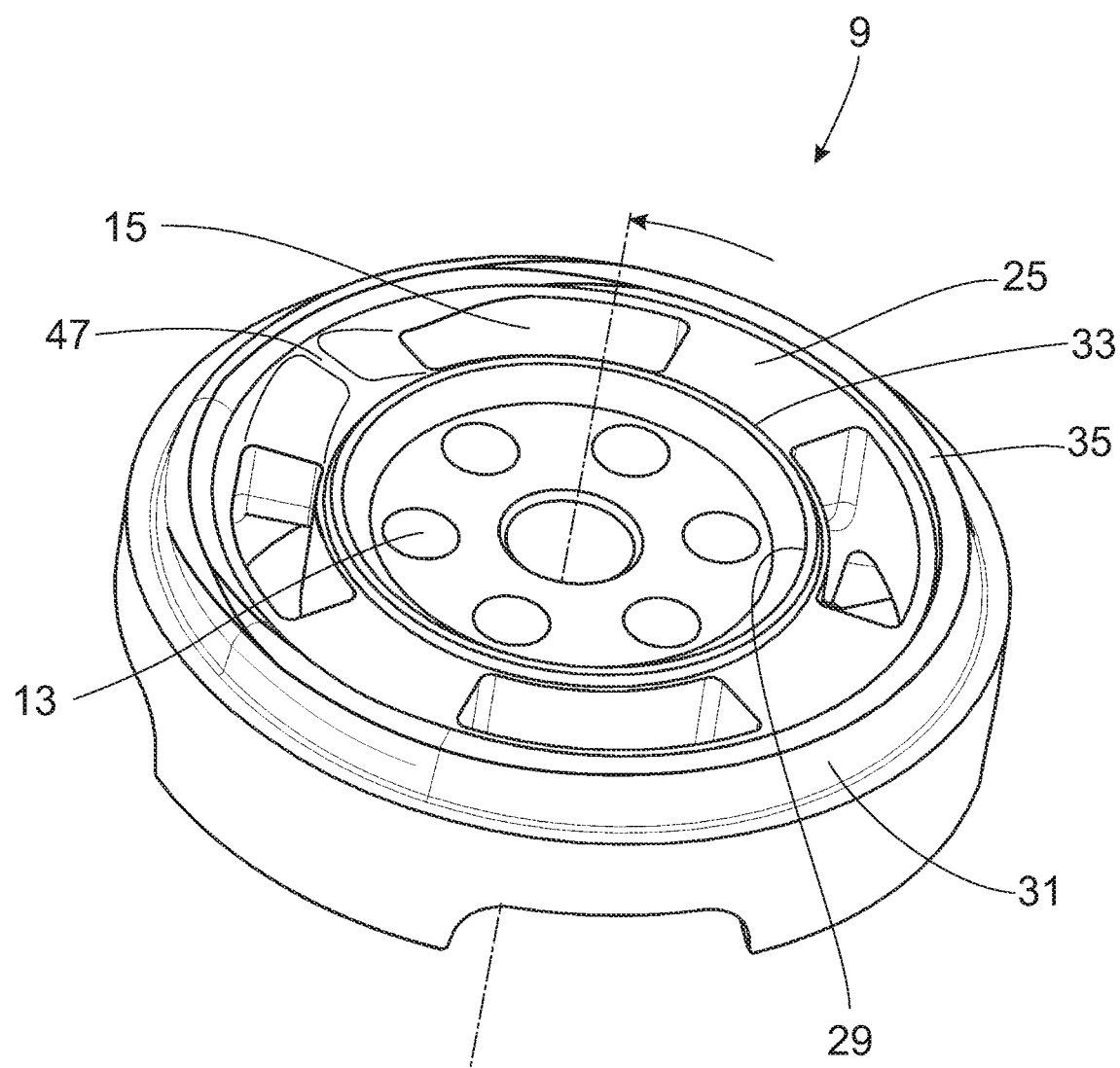
FIG. 2 is a perspective view of the damping valve body.

An embodiment example of a damping valve body 9 of the damping valve 7 is shown in perspective in FIG. 2 and in a conventional top view in FIG. 3. The passages 11 preferably have an arcuate outlet orifice which forms the inlet orifice 15 in a base 27 for an annular groove 25. The annular groove 25 is limited by an annular web 29 on the radially inner side with reference to a center axis of the damping valve 7 and by an annular web 31 on the radially outer side with reference to the center axis of damping valve 7 (FIG. 4). Each of these two webs 29; 31 forms a valve seat surface 33; 35 for a valve disk 17 shown in FIG. 1.

The outer web 31 has two functional areas. In a first circumferential area 37, the valve seat surface 35 of outer web 31 comprises a radially wide, planar surface support for the valve disk 17 which extends over at least 60% of the web. In the present instance, the outer web 31 has a trapezoidal cross section. In the construction variant pictured here, the first area extends over about 75% of the web. The second circumferential area 39 of the outer web 31 has a valve seat surface with a rounded cross section so that the latter offers a linear support rather than a surface support for the valve disk. The limit for the linear support is determined by the method of producing the damping valve body and by inevitable wear. This results in a crescent-shaped contact pattern for the first circumferential area.

Of course, the second circumferential area 39 can also be constructed in a different cross-sectional shape, e.g., so as to form an acute angle in cross section or the like. However, a support having a radius has proven particularly robust over the life of the damping valve and has proven simple to produce. Beyond this, the support of the valve disk can be defined and the reduction in the adhering effect can be determined by the magnitude of the radius R.

Further, when FIGS. 2 and 4 are viewed together it can be seen that the base 27 of the annular groove 25 has a maximum distance 42 (left-hand side of the section in FIG. 4) from the valve seat surface 35 along a circumferential area 43 and has a minimum axial distance 44 (right-hand side of the section) from the valve seat surface 35 along a circumferential area 41.

The area of the valve seat surfaces 35 with the crescent shape is oriented in circumferential direction toward the annular groove 25 such that the area 37 of the valve seat surface 35 with the greatest radial width 41 is arranged in the area of minimum distance 44 of the base 27 from valve seat surface 35.

The annular groove 25 has a transition area 45 between the circumferential area 43 having a maximum distance 42 and the adjoining circumferential area 41 having a short distance 44. In the embodiment example, the damping valve body 9 has only two depth areas of the annular groove so that the circumferential area 41 with the short distance 44 is disposed opposite the circumferential area 43 with the maximum distance 42 from the base 27 of the annular groove 25 to the valve seat surface 35.

The damping valve body 9 shown in FIG. 2 is preferably produced in a creative forming process, e.g., sintering, injection molding, or die casting. In all of these methods, a uniform material distribution at the workpiece is aimed for. Particularly for the sintering process, it is provided that at least a portion of the material volume 47 arising from the differences in spacing in the annular groove 25 is arranged separately from a functional surface 33; 35 of the damping valve body 9. In this way, already existing valve disks for a conventional damping valve body can also be used in this type of construction.

As is further shown in FIGS. 2 and 3, the material volume 47 resulting from the material displacement for the different annular groove depths is arranged in the annular groove 25 such that there results only a small displacement distance for the material volume 47 particularly if the material volume 47 is arranged in the circumferential area 43 of the annular groove 25 with the maximum distance 42.

In so doing, care shall be taken that an axial offset 53 is provided between an upper side 49 of the material volume 47 and the valve seat surfaces 33; 35. The size of the surface area acted upon compressively by damping medium shall not be reduced through the material volume 47. This detail is shown in an enlarged manner in FIG. 5A.

The annular groove 25 has at least two adjacent inlet orifices 15 in the circumferential area 43 of maximum distance. The material volume 47 is arranged between the two inlet orifices 15. The material volume is formed as a cone resulting in one half of a funnel for each inlet opening 15 (FIG. 2).

As can be seen from FIG. 4, the damping valve body 9 has along the entire circumference a plane 52 at right angles to the longitudinal axis 50 of the damping valve body on the side remote of the annular groove 25. In particular, an annular groove 25 with outlet orifices 51 for the valve disks 21 at the underside of the damping valve body is not influenced by the amassed material volume 47 in the annular groove 25 on the upper side.

When flow impinges on the damping valve 7 and, therefore, damping medium is fed into the annular groove 25, a filled annular groove is permanently present because the working chamber 3 is filled with damping medium on principle. Therefore, a dynamic inflow state exists, on the basis of which the different cross sections in the annular groove 25 affect one another. In the circumferential area 43 of the annular groove 25 at a greater distance 42 between the base 27 and the valve seat surface 35, the cross section is also larger and the throughflow resistance is accordingly less. Consequently, the damping medium can pass the annular groove 25 more easily in this location. The lift-off motion is supported through the linear contact of the valve disk 19 on the valve seat surface 35 or a deliberate adhering effect based on the radially relatively wide valve seat surface between the valve disk 17 and the valve seat surface 35 in circumferential area 41 with minimum distance 44 between base 27 and valve seat surface 35.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve comprising:
 a damping valve body having an annular groove, the annular groove having a base, and the annular groove being limited, on a radially inner side of the annular groove, with reference to a center axis of the damping valve, by an inner valve seat surface for seating a valve disk, and being limited, on a radially outer side of the annular groove, with reference to a center axis of the damping valve, by an outer valve seat surface for seating the valve disk; and wherein the base of the annular groove has a maximum distance from the outer valve seat surface along a first circumferential area and has a minimum axial distance from the outer valve seat surface along a second circumferential area,
 wherein the annular groove comprises an inclined transitional area between the first circumferential area at the maximum distance from the base of the annular groove to the outer valve seat surface and an adjoining circumferential area at a shorter distance from the base of the annular groove to the outer valve seat surface.

2. The damping valve according to claim 1, additionally comprising a material volume arising from the difference in distance from the base of the annular groove to the outer valve seat surface; and wherein at least a portion of the material volume is arranged separate from the inner and outer valve seat surfaces of the damping valve body.

3. The damping valve according to claim 2, wherein the material volume is arranged in the annular groove.

4. The damping valve according to claim 3, further comprising an axial offset between an upper side of the material volume and the inner and outer valve seat surfaces.

5. The damping valve according to claim 3, wherein the material volume is arranged in the circumferential area of the annular groove having the maximum distance from the base of the annular groove to the inner and outer valve seat surfaces.

6. A damping valve comprising:
 a damping valve body having an annular groove, the annular groove having a base, and the annular groove being limited, on a radially inner side of the annular groove, with reference to a center axis of the damping valve, by an inner valve seat surface for seating a valve disk, and being limited, on a radially outer side of the annular groove, with reference to a center axis of the damping valve, by an outer valve seat surface for seating the valve disk; and wherein the base of the annular groove has a maximum distance from the outer valve seat surface along a first circumferential area and has a minimum axial distance from the outer valve seat surface along a second circumferential area; and
 a material volume arising from the difference in distance from the base of the annular groove to the outer valve seat surface; and wherein at least a portion of the material volume is arranged separate from the inner and outer valve seat surfaces of the damping valve body,
 wherein the material volume is formed as a cone.

7. A damping valve comprising:
 a damping valve body having an annular groove, the annular groove having a base, and the annular groove being limited, on a radially inner side of the annular groove, with reference to a center axis of the damping valve, by an inner valve seat surface for seating a valve disk, and being limited, on a radially outer side of the annular groove, with reference to a center axis of the damping valve, by an outer valve seat surface for seating the valve disk; and wherein the base of the annular groove has a maximum distance from the outer valve seat surface along a first circumferential area and has a minimum axial distance from the outer valve seat surface along a second circumferential area; and
 a material volume arising from the difference in distance from the base of the annular groove to the outer valve seat surface; and wherein at least a portion of the material volume is arranged separate from the inner and outer valve seat surfaces of the damping valve body,
 wherein the material volume is arranged in the annular groove, and
 wherein the annular groove comprises at least two adjacent inlet orifices in the circumferential area having the maximum distance, and the material volume is arranged between the at least two inlet orifices.

\* \* \* \* \*